Oct. 2, 1956  J. W. WORTHINGTON  2,764,846
PLANT SUPPORT
Filed June 27, 1955

INVENTOR.
JAMES W. WORTHINGTON
BY
Buckhorn and Cheatham
ATTORNEYS

United States Patent Office 2,764,846
Patented Oct. 2, 1956

2,764,846

PLANT SUPPORT

James W. Worthington, The Dalles, Oreg.

Application June 27, 1955, Serial No. 518,027

4 Claims. (Cl. 47—47)

The present invention relates to a new and improved device for supporting growing plants.

Plant supporting devices have been proposed heretofore including a stake adapted to be driven into the ground and having plant embracing members arranged to extend horizontally from the stakes. Certain of such prior devices have been unsuitable for the reason that the plant embracing members were not suitably braced and were incapable of supporting heavy plants and others were objectionable because they were too costly to manufacture.

It is an object of the present invention to provide a plant support of the character described including plant embracing members which are capable of supporting substantial loads.

It is another object of the invention to provide a plant supporting device that is capable of manufacture at low cost.

Still another object of the invention is to provide a plant supporting device that can be collapsed easily and quickly for storage or can be easily and quickly erected for use in the garden.

Other objects and advantages of the invention will become apparent hereinafter.

In accordance with the illustrated embodiment, the present invention comprises a stake adapted to be driven into the ground and having a plurality of plant supporting members mounted thereon in the form of loops of wire which may be pivoted from a plant supporting horizontal position to a collapsed position in which they are substantially parallel with the stake.

For a more detailed description of the invention, reference is made to the accompanying drawings wherein.

A plant supporting device of the invention comprises a post or stake 10 adapted to be driven into the ground 12 adjacent the plant to be supported which may be a vinelike vegetation such as tomatoes or a stem plant such as indicated at 11. The stake 10 is shown as being rectangular but may be round or of another cross sectional configuration, and may be formed of wood or other suitable material. Mounted on the stake are a plurality of plant supporting members in the form of lengths of wire bent to form loops 14, 15, 16 and 17. In the illustrated embodiment of the invention the loops are shown as being of increasing diameter from the bottom to the top of the stake. It will be apparent that the selection of diameter is a matter of choice, and the loops may all be of the same diameter or of any variation.

Figure 3:
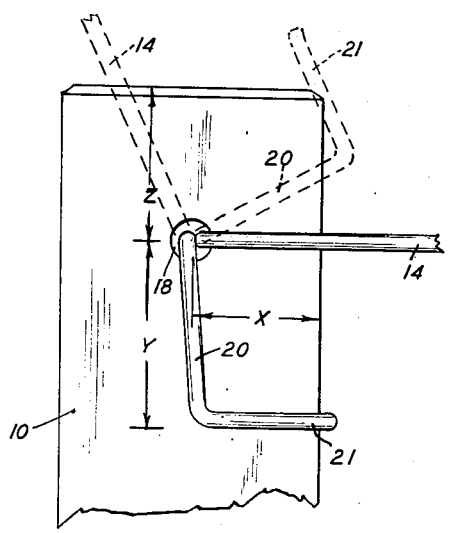
Fig. 3 is an enlarged, fragmentary perspective view of one of the wire loops with the stake shown in phantom to illustrate more clearly the arrangement of the loop on the stake.

With particular reference to Fig. 3, the opposite end portions of the wire forming a loop extend in opposite directions through a corresponding, enlarged opening 18 extending transversely through the stake 10. Each of the end portions of a wire is bent at its point of emergence from the opening 18 substantially at right angles to the plane of the loop portion of the wire and in the same direction to define a short leg 20. In the illustrated embodiment the legs 20 extend downwardly from the corresponding loop when the loop is horizontal. Each of the end portions of a wire is further bent at the end of the corresponding leg to define arms 21 which extend from the legs along the side of the stake parallel to the loop and towards the front thereof when the loop is horizontal, the ends of the wire terminating in hooks 22 which engage the front of the stake to impose thereon the thrust of the load imposed by a plant on a loop, thus to hold the loop in horizontal position. Preferably the ends of the wire are tacked together as shown at 24 by welding or brazing to prevent the hooks 22 from parting and giving under a load.

Figure 1:
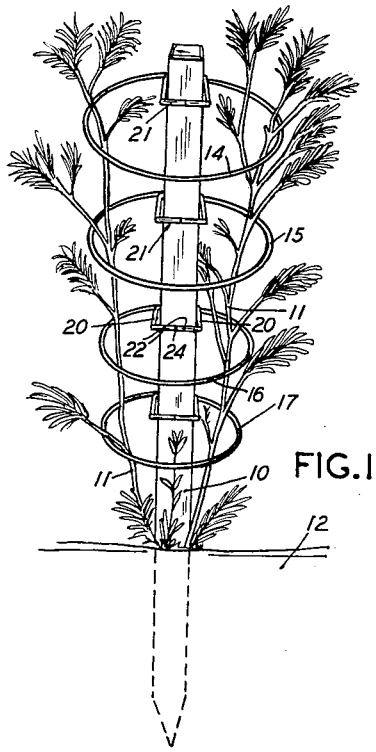
Fig. 1 is a front elevational view showing the stake of the invention erected for supporting a plant.
Figure 4:
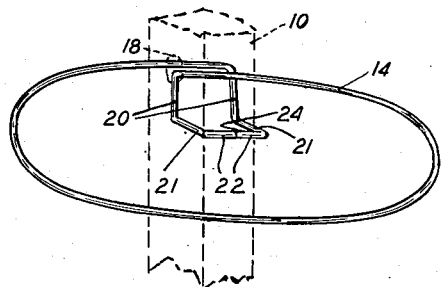
Fig. 4 is an enlarged, fragmentary view showing the arrangement of the top loop on the stake.

With particular reference to Fig. 4, the legs 20 preferably have a length indicated at Y somewhat greater than the distance between the stake opening 18 and the side of the stake engaged by the arms 21 when the loop is in horizontal position, such distance being indicated at X. This length of the legs 21 is necessary to permit swinging of the loops from a horizontal position, as shown in Fig. 1, to the collapsed position as shown in Fig. 2.

Figure 2:
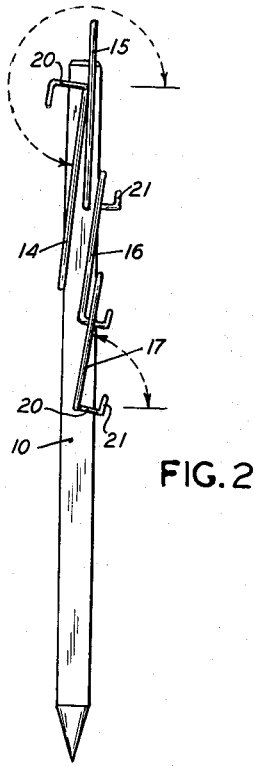
Fig. 2 is a side elevation of the stake with the wire loops arranged for storage of the stake.

To reduce the overall length of the collapsed stake and facilitate its storage, the opening 18 for the top loop is preferably spaced below the top of the stake by a distance Z less than the length Y of the leg 20, so that the loop and arms 21 of the top supporting member 14 may be swung completely over the stake and down against the opposite side thereof as shown in Fig. 2. With the top loop thus positioned, it does not project beyond the end of the stake as it would if it could not be swung over the top of the same.

It will be noted that the stake of the invention is of simple design and may be manufactured with ease and at low cost. Moreover, it may be easily erected or collapsed and when erected each of the plant supporting members will be held in horizontal position and will support any load short of that capable of deforming the wire.

Having illustrated and described a preferred embodiment of the invention, it should be apparent to those skilled in the art that the invention permits of modification in arrangement and detail. I claim as my invention all such modifications as come within the true spirit and scope of the appended claims.

I claim:

1. A plant support comprising a stake adapted to be driven vertically into the ground, said stake having a transverse opening therethrough, a wire having opposite end portions extending through said opening and defining a planar plant supporting loop which extends horizontally from said stake in the operative position thereof, said end portions being formed to define legs extending angularly with relation to the plane of said loop and along the opposite side surfaces of the stake, said end portions each being further formed to define hooks for engaging against said stake when said loop is horizontal and imposing on said stake the thrust of the load supported by said loop thus to support the same in horizontal position.

2. A plant support comprising a rectangular stake for driving vertically into the ground and having a transverse opening therethrough, and a wire bent to form a substantially planar loop, the opposite end portions of said wire extending through said opening in opposite directions, each end portion being bent at its point of emergence from said opening substantially at right angles to the plane of said loop and in the same direction from said plane to define a short leg extending along the side of the stake, said end portions being further bent at the end of the corresponding leg to define arms extending from the legs parallel to said loop, said end portions being bent at the ends of said arms to define hooks extending at right angles to said arms for engaging said stake when said loop is perpendicular thereto to hold the same in horizontal position against the force of the weight of a plant supported on said loop.

3. A plant support as in claim 2 wherein said legs are of a length at least as great as the distance between said opening and the side of the stake engaged by said hooks whereby to permit swinging of said loop upwardly to a position substantially parallel with said stake.

4. A plant support comprising a vertical stake having a transverse opening therethrough, a wire bent to form a planar loop, the opposite end portions of said wire extending through said opening in opposite directions, each of said end portions being bent at right angles to the plane of the loop and to define short legs which extend downwardly along the sides of the stake when said loop is in a horizontal position, said end portions being further bent to define arms extending at right angles from the lower end of said legs and in the direction of said loop and having hooks at the ends thereof engaging said stake when said loop is in horizontal position to hold the same therein, said legs being of a length at least as great as the distance between said opening and the side of the stake engaged by said hooks as measured at right angles to the axis of the opening, said opening being spaced below the top of the stake by a distance less than the length of said legs whereby said loop may be swung over the top of the stake from its horizontal plant supporting position to a collapsed position substantially parallel to the stake.

References Cited in the file of this patent

UNITED STATES PATENTS

| | | |
|---|---|---|
| 417,838 | Richards | Dec. 24, 1889 |
| 1,627,495 | Effley | May 3, 1927 |